Figure 1:
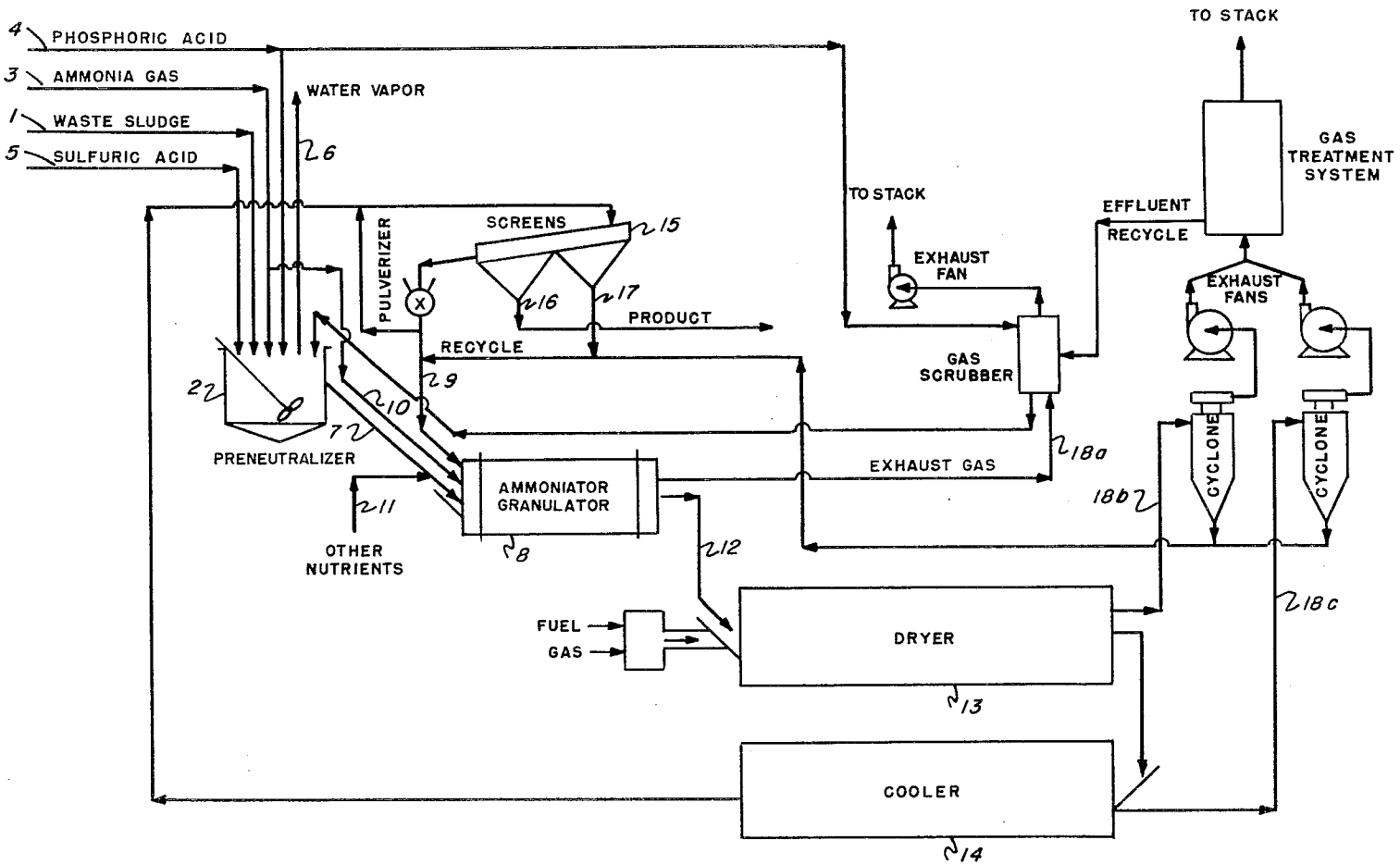
Figure 2:
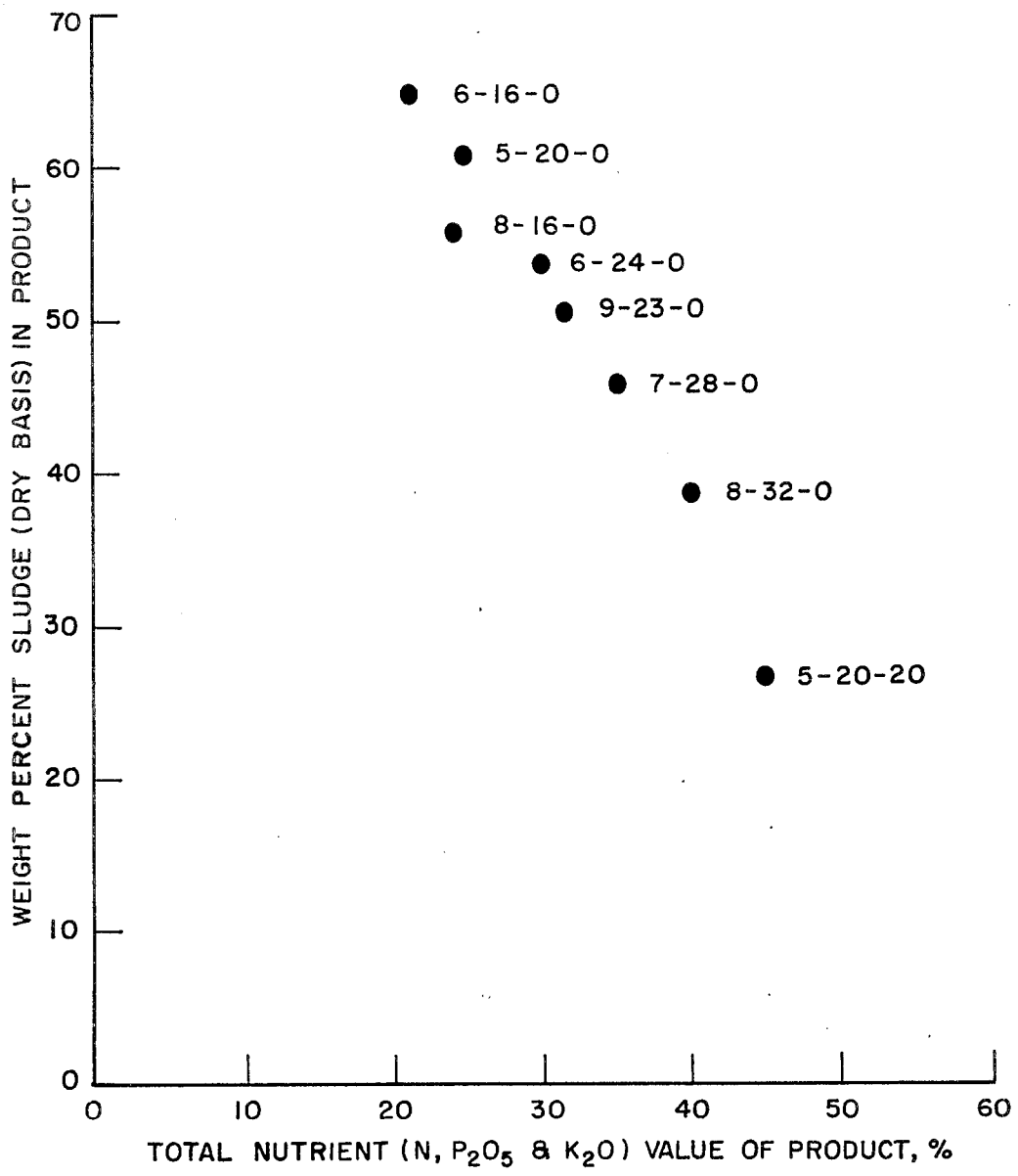
Figure 3:
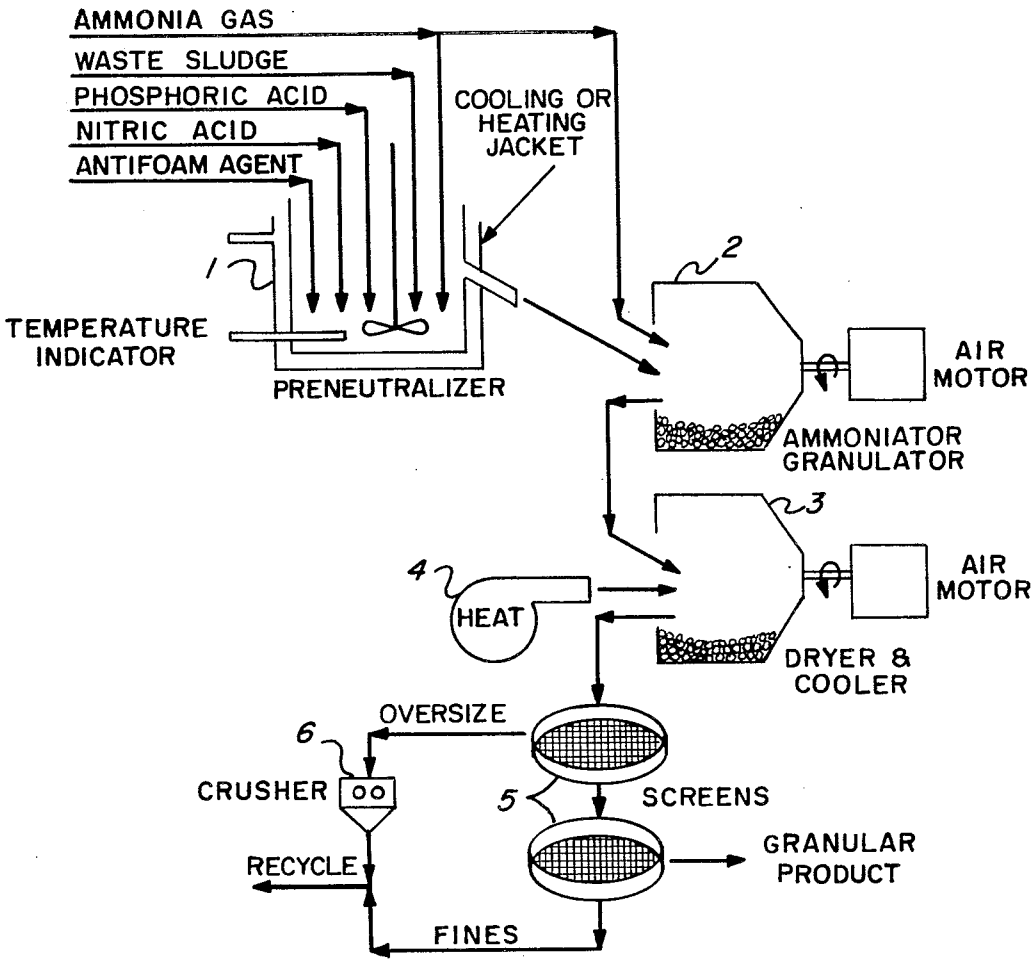

United States Defensive Publication [19] (H) [11] T955,002

Schultz et al. [43] Feb. 1, 1977

[54] FERTILIZER PROCESSES INCORPORATING SCRUBBED FLUE GAS SLUDGE BYPRODUCT

[75] Inventors: James J. Schultz; Vincent J. Van Pelt, both of Florence, Ala.

[73] Assignee: Tennessee Valley Authority

[21] Appl. No.: 660,054

[22] Filed: Feb. 23, 1976

[51] Int. Cl.$^2$ ..... C05F 7/00

[52] U.S. Cl. ..... 71/25; 71/34; 71/43; 423/310

[57] ABSTRACT

A process for the production of a granular fertilizer material from sludge materials discharged from scrubbing processes that remove pollutants from boiler flue gases. Waste sludge discharged from flue gas scrubber systems often contain large amounts of calcium and sulfur as well as lesser amounts of other compounds known to have plant nutrient value. The sludge is treated with an acid such as phosphoric, sulfuric or nitric, or a mixture of these, and ammonia. The resulting sludge-ammonia-acid salt mixture is combined with partially dried, previously processed solid material (recycle) in a horizontal rotating vessel. Additional ammonia and/or acid is added to the rotating vessel to cause the sludge-salt mixture to solidify and granulate. Other plant nutrients may be added to the rotating vessel during granulation. The granulated material discharged from the rotary vessel is further processed (dried, cooled, and screened) to obtain desirable moisture content and particle size.

8 Claims, 3 Sheets Drawing,

15 Pages Specification

The file of this unexamined application may be inspected and copies thereof may be purchased (849 O.G. 1221, Apr. 9, 1968).

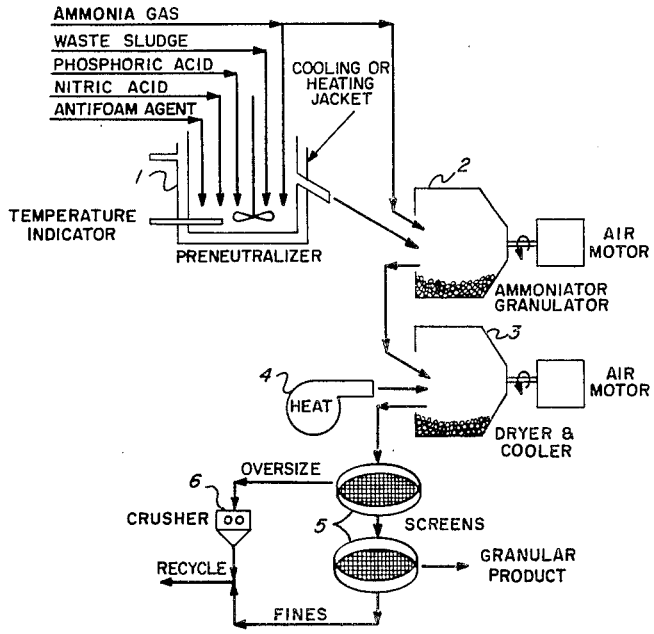

LABORATORY EQUIPMENT USED TO PREPARE GRANULAR FERTILIZER FROM WASTE SCRUBBER SLUDGE

PROCESS FOR THE PRODUCTION OF SOLID GRANULAR FERTILIZER MATERIAL FROM SCRUBBER SLUDGE

LABORATORY EQUIPMENT USED TO PREPARE GRANULAR FERTILIZER FROM WASTE SCRUBBER SLUDGE